United States Patent

[11] 3,624,417

[72] Inventor Tich T. Dao
Cupertino, Calif.
[21] Appl. No. 817,694
[22] Filed Apr. 21, 1969
[45] Patented Nov. 30, 1971
[73] Assignee Ampex Corporation
Redwood City, Calif.

[54] HIGH-SPEED PULSE DRIVER FOR MODULATORS, MAGNETIC MEMORIES, AND THE LIKE, HAVING A COMPLEMENTARY PUSH-PULL OUTPUT STAGE
4 Claims, 2 Drawing Figs.

[52] U.S. Cl. .......... 307/270, 307/247, 307/255, 330/30 D
[51] Int. Cl. .......... H03k 17/00
[50] Field of Search .......... 307/255, 247, 270, 254; 330/30, 30 D; 320/146, 57

[56] References Cited
UNITED STATES PATENTS 3,222,547 12/1965 Boan et al. .......... 307/255
3,259,761 7/1966 Narud et al. .......... 307/254

*Primary Examiner*—Donald D. Forrer
*Assistant Examiner*—B. P. Davis
*Attorney*—Robert G. Clay

ABSTRACT: An output driver stage employs a pair of push-pull complementary transistor switches which are driven in phase, e.g., both off or both on. Two driving currents are provided to the output stage which currents are truly complementary, e.g., equal in phase with one sinking and the other sourcing. Reversed current flow is provided in one of the branches of the output stage by means of a "dummy" transistor stage and a constant current source, whereby the voltage output of the complementary transistor switches as seen between the collectors thereof will range from zero to double the possible breakdown voltage of each transistor switch.
Thus the invention simulates a center tap transformer circuit, but further provides large bandwidth characteristics down to DC.
The invention herein described was made in the course of a contract with the Department of United States Army.

PATENTED NOV 30 1971

3,624,417

INVENTOR.
TICH T. DAO

BY Robert G. Clay

ATTORNEY

HIGH-SPEED PULSE DRIVER FOR MODULATORS, MAGNETIC MEMORIES, AND THE LIKE, HAVING A COMPLEMENTARY PUSH-PULL OUTPUT STAGE

BACKGROUND OF THE INVENTION

1. Field of the Invention

The invention relates to driver circuits and more particularly, to a high- low-voltage high-speed, pulse driver for laser modulators, magnetic memory balanced line drivers, etc.

2. Description of the Prior Art

Prior art modulator drivers generally fall within two types; a high-voltage, high-speed, driver circuit utilizing a transistor output switch having of the order of a 300 -volt breakdown; and a high-voltage, high-speed, push-pull output driver utilizing a pair of PNP or NPN-transistors with a breakdown voltage equal to or greater than 300 volts, operating in class A, B or C and driven in opposite phases. Either of the above approaches requires high-speed transistors with breakdown voltages equal to or greater than 300 volts which are not yet available in the present state of the art. The second-mentioned system may provide relatively high-speed operation but still requires high-power transistors.

Prior art magnetic memory balanced line drivers provide low-voltage , high-current, balanced current drive, and have generally used a push-pull-type driver employing a transformer to provide the complementary drive current pulse characteristics desired. Such a transformer oriented driver circuit is relatively expensive, limited in frequency response (e.g., can not go to DC) and generally is bulky in size. For high-voltage applications a relatively huge transformer is required, and several transformers are needed along with suitable switching means to allow operation over a wide range of frequencies.

SUMMARY OF THE INVENTION

In one embodiment, the present invention provides a high-voltage, high-speed, pulse driver for laser modulators, and in another exemplary embodiment, provides a low-voltage high-current, high-speed, pulse driver wherein the balanced current drive is particularly useful for low-voltage memory line drives. The invention in any embodiment utilizes a current reversing, or "dummy", transistor to reverse the current introduced to one of a pair of complementary push-pull transistor switches of an output stage, which are driven in phase; e.g., both off or both on. A modified DC differential amplifier is coupled to the output stage to provide two driving currents thereto which are also truly complementary; e.g., equal, in phase, with one sinking and the other sourcing. The current flow in one output branch is reversed by the dummy transistor to provide thus equal and opposite current flow through the pair of complementary transistor switches in the output stage, thereby doubling the possible output voltage while maintaining high-speed operation.

It may be seen that the invention driver simulates the operation of a center tap transformer, but has in addition a wide bandwidth capability down to DC Thus the driver can generate a high-voltage pulse with low-voltage transistors, or can drive memory circuits wherein low- or high-voltage, balanced current drive is required.

DESCRIPTION OF THE PREFERRED EMBODIMENTS

Figures 1, 2:
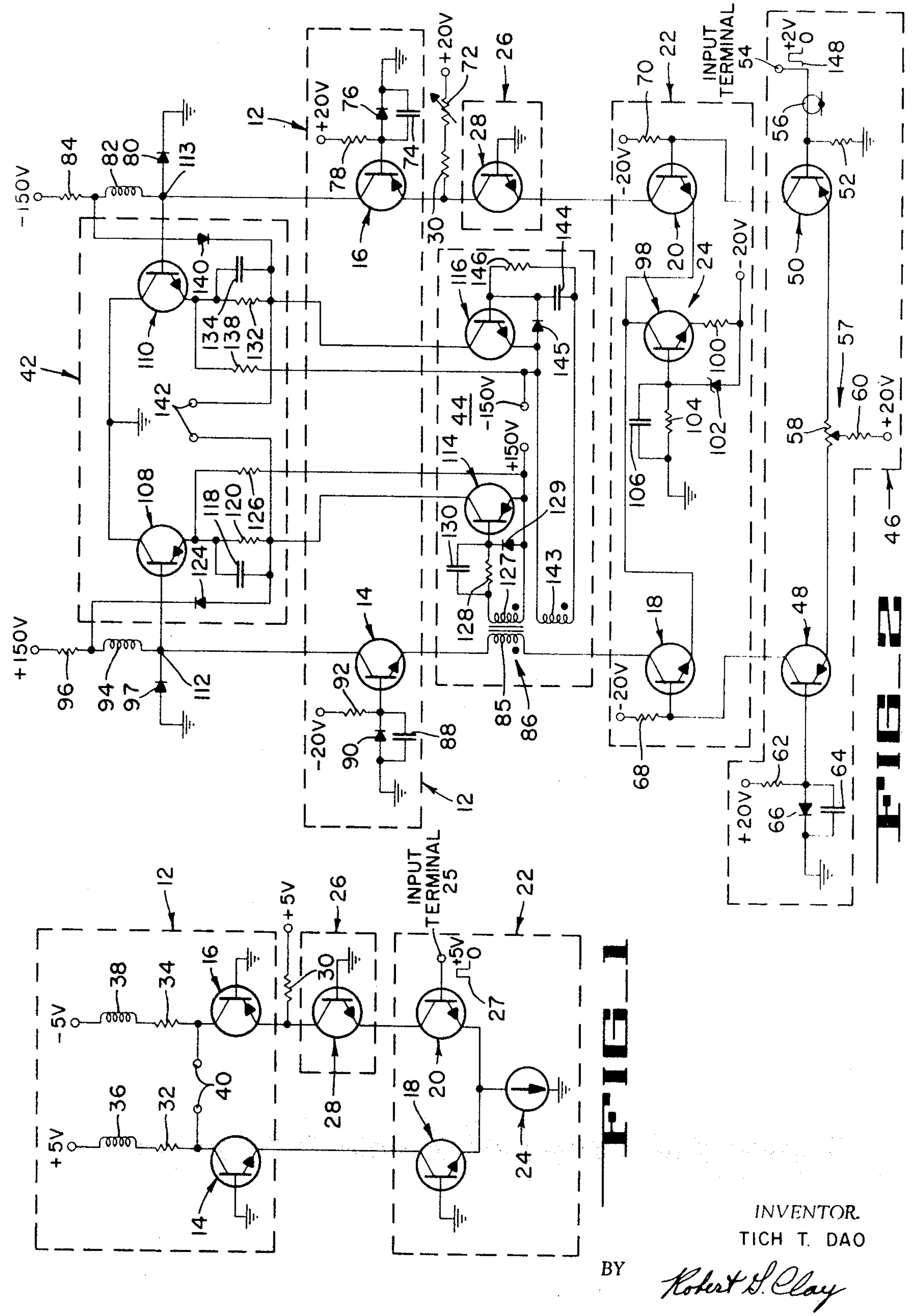
FIG. 1 is a simplified schematic diagram of a basic embodiment of the invention, which is particularly applicable to low-voltage high-current, high-speed, balanced line, driver applications.
FIG. 2 is a more detailed-schematic diagram of an embodiment of the invention, which is particularly applicable in high-voltage, high-speed, pulse driver applications.

Referring accordingly to FIG. 1, a push-pull output stage 12 is formed of a pair of complementary transistors 14, 16 having emitter, collector and base electrodes respectively. The bases are coupled to ground, and the emitters thereof are coupled to collector electrodes of a second pair of transistors 18, 20 which form (along with a transistor 28) a modified differential amplifier stage 22. A constant current source 24 is coupled to the emitters of the transistors 18, 20. The base of transistor 18 is grounded, and an input terminal 25 is coupled to the base of transistor 20 for introduction of an input signal or signals representing the desired modulation information. A single input signal 27 of 30 5 volts is depicted here by way of example.

A "dummy" transistor stage 26, including the transistor 28 of previous mention, is inserted in the branch between the transistors 20 and 16, wherein the emitter of transistor 28 is coupled to the collector of transistor 20, the base is grounded, and the collector thereof is coupled to the emitter of transistor 16. A resistor 30 provides coupling from the junction between transistors 16, 28 to a positive constant current source of the order of, for example, 5 volts. It is to be understood that although specific voltages are used herein in describing the exemplary circuits of FIGS. 1 and 2, other values may be used instead, depending upon the particular circuit application.

The collectors of the transistors 14, 16 are coupled respectively to a positive and a negative voltage of the order of, for example, .5 volts, via respective resistors 32, 34 and inductor coils 36, 38. An output signal of twice the voltage (e.g., 10 volts total in this example) is obtained via output terminals 40 coupled to the collectors of the transistors 14, 16. The output is a balanced current drive which may be used to drive magnetic memory drive lines (not shown).

Note that in low-voltage applications the inductor coils 36, 38 may not be required, since they function as series peaking inductors for improving the rise time of the driving pulses. In addition, if current gain is desired the circuit of FIG. 1 may be modified to include a predriver stage such as that described below with reference to FIG. 2, which is coupled to the inputs (bases of transistors 18, 20) of the differential amplifier stage 22. Note also that inputs may be supplied to either base of the transistors 18, 20.

Although the circuit of FIG. 1 is described with reference to low-voltage applications, it may readily be modified for high-voltage applications. To this end, the collectors of the complementary transistors 14, 16 are supplied with, for example ±150 volts rather than ±5 volts as shown, and a constant current source of +20 volts is supplied to the collector of transistor 28 and emitter of transistor 16. In this embodiment, the invention circuit is capable of supplying modulator driving pulses at twice the voltage of the usual transistor breakdown voltage, which in this case is 150 volts, while still providing balanced current drive.

Thus the circuit of FIG. 1 may be operated at a positive and negative 150 volts for high-voltage, high-speed, pulse driver applications, such as when driving a laser modulator. On the other hand, the circuit may be operated as shown with 2 to 30 volts applied to the collectors of transistors 14, 16 for low-voltage balanced, high-current applications, such as when driving the drive lines of a magnetic memory device.

In operation, prior to supplying an input pulse 27 to the input terminal 25, the circuit is at steady state and not current flows in the output terminals 40. Transistors 14, 16 and 18 are biased on while transistors 20 and 28 are turned off. Thus the positive 5 volts coupled to the collector of transistor 28 is fed to ground via the transistor 16. Output terminals 40 are thus at zero volts.

Upon application of the positive pulse 27 to input terminal 25, the transistors 14, 16 and 18 are biased off and transistors 20 and 28 are biased on, and the positive and negative voltage sources coupled to the collectors of transistors 14, 16 provide 10 volts across the output terminals 40 in accordance with the invention.

Referring now to FIG. 2, there is shown in greater detail a second embodiment of the invention particularly adapted to high-voltage, high-speed, laser modulator driver applications, wherein the modulator provides a capacitive load. Accordingly, FIG. 2 provides a driver which delivers a pulse width of less than 50 nanoseconds at 300 volts, to a capacitive load of about 50 microfarads.

To this end, the driver of FIG. 2 comprises a push-pull output stage 12 formed on the complementary transistors 14, 16 having emitter, collector and base electrodes respectively. The output stage 12 is coupled as in FIG. 1 to the differential amplifier stage 22 formed of the second pair of transistors 18, 20. The constant current source 24 (further described below) is operatively coupled to the transistors 18, 20. The dummy transistor stage 26, comprising the transistor 28, is coupled between the transistors 16 and 20 of the output stage 12 and differential amplifier stage 22 respectively. Thus similar components of the circuits of FIGS. 1 and 2 are similarly numbered.

Since the load in this example is a capacitive load which requires charging to a voltage level of, for example, 300 volts in this specific embodiment of the invention, a current driver circuit is required between the output of the output stage 12 and the capacitive load, which current driver circuit is herein indicated by numerals 42 and 44. More particularly the current driver circuit comprises a discharge and a charge stage, herein indicated by numerals 42, 44 respectively. In addition, a predriver stage 46 is coupled to the inputs of the differential amplifier stage 22 and provides thereto two equal, in phase, currents flowing in opposite directions, e.g., one sinking, the other sourcing.

It may be seen that the stages 12, 22 and 26 are essentially those shown in FIG. 1 with added circuitry, wherein additional stages 42, 44 and 46 are employed in the embodiment of FIG. 2 to adapt same for driving a capacitive load at high voltage and high speed. If a resistive load is to be driven the stages 42 and 44 would not be necessary.

Accordingly, to fully switch the current between the transistors 18 and 20 of the differential amplifier stage 22 the predriver stage 46 includes a pair of transistors 48, 50 having base, emitter and collector electrodes. The base of transistor 50 is coupled to an input terminal 54 via a coaxial line 56, which is terminated by a (50 ohm) resistor 52. The emitter of transistor 50 is connected to a constant current source 57 including a potentiometer 58, the center tap of which is coupled to a positive 20 volt source via a resistor 60. Likewise, the emitter of transistor 48 is coupled to the potentiometer 58, and the base thereof is coupled via a resistor 62 to a positive 20 -volt source, and to ground via a capacitor 64 and a diode 66. The anode and cathode of diode 66 is connected to the base while the anode is coupled to ground. Thus the base of transistor 48 is biased above that of transistor 50 when the input to the latter is at zero volt. In this condition transistor 48 is cut off and transistor 50 is on full. The adjustment of the potentiometer 58 serves to ensure this condition.

The collectors of transistors 48, 50 are coupled to the base of the transistors 18, 20 respectively, and from thence to negative 20 -volt sources via resistors 68, 70 respectively. As described with reference to FIG. 1, the collector of transistor 20 is coupled to the emitter of the transistor 28; the latter comprising the dummy transistor stage 26. The collector of transistor 28 is then coupled to the emitter of transistor 16, wherein the junction therebetween is coupled to a positive 20 -volt source via the resistor 30 and a variable resistor 72. In the circuit of FIG. 2 the base of transistor 16 is coupled to ground via a capacitor 74 and diode 76, and also to a positive 20 -volt source via a resistor 78. The anode of the diode 76 is coupled to the base while the cathode thereof is coupled to the anode of a ground. The collector of transistor 16 is coupled to the anode of a diode 80 whose cathode is connected to ground, and is further coupled to a negative 150 -volt source via an inductor coil 82 and resistor 84 analogous to those in FIG. 1.

The collector of transistor 18 of differential amplifier stage 22 is coupled via a primary 85 of a transformer 86 and thence to the emitter of transistor 14. As in the case of transistor 16, the transistor 14 base is coupled to ground via a capacitor 88 and a diode 90 whose anode is coupled to ground. The base is also coupled to a negative 20 -volt source via a resistor 92. The collector of transistor 14 is coupled to a positive 150 -volt source via an inductor coil 94 and resistor 96 analogous to those of FIG. 1. The collector of transistor 14 is also coupled to the cathode of a diode 97, whose anode is connected to ground.

The constant current source 24 of the differential amplifier stage 22 further comprises a transistor 98 whose collector is coupled to the emitters of transistors 18, 20 and whose emitter is coupled to a negative 20 -volt source via a resistor 100. The base of the transistor 98 is coupled to the cathode of a Zener diode 102 whose anode is connected to the negative 20 -volt source, while further connected to ground via a resistor 104 and capacitor 106.

As previously noted, in order to discharge and charge the capacitive-type load, e.g., the modulator, rapidly to and from the 300 -volt level, the stages 42 and 44 are coupled to the output of the push-pull output stage 12 and to the capacitive load. Accordingly, the load discharge stage 42 includes a pair of transistors 108 and 110 wherein the collectors are coupled to ground, and the bases thereof are coupled to the collectors of the transistors 14, 16 respectively. Note that the junctions herein indicated by numerals 112 and 113 are analogous to the output terminals 40 of FIG. 1; e.g., junctions 112, 113 would be the output of the output stage 12 of FIG. 2 if stages 42, 44 were omitted. The transistors 108, 110 are essentially negative and positive emitter follower circuits.

The load-charge stage 44 includes a pair of transistors 114, 116. The emitter of transistor 108 of stage 42 is coupled to the collector of the transistor 114 via a capacitor 118 and a resistor 120. The collector of transistor of 114 is likewise coupled to the junction between resistor 96 and inductor coil 94 via a diode 124 whose anode is coupled to the collector. A resistor 126 is coupled from the emitter of transistor 108 to the emitter of transistor 114, and thence to a positive 150 -volt source.

The base of transistor 114 is connected to one side of a secondary 127 of the transformer 86 via a resistor 128 and capacitor 130, wherein the other side of the secondary 127 is coupled to the emitter thereof. A diode 129 is connected across the base and emitter of transistor 114. The transformer thus provides transformer coupling to the output of the differential amplifier stage 22; e.g., the transistor 18 collector, during the rise and fall time of the input signal.

The transistor 110 and 116 are coupled identically to transistors 108, 114 respectively, utilizing a resistor 132, capacitor 134, resistor 138 and a diode 140. The anode of diode 140 is coupled to the junction between resistor 84 and inductor coil 82. Output terminals 142 are provided for coupling to the capacitive load, e.g., the laser modulator in this particular example, which output terminals 142 are coupled to the junction between resistor 120, collector of transistor 114 and diode 124, and to the junction between resistor 132, collector of transistor 116 and the diode 140, respectively.

The transistor 116 is transformer coupled during the rise and fall time of the input signal, via a secondary winding 143 of transformer 86, a capacitor 144, a resistor 146, and the emitter thereof. The emitter is further connected to the resistor 138. A diode 145 is connected across the base and emitter of transistor 116.

The operation of the embodiment of FIG. 2 is essentially the same as that of FIG. 1. More particularly, prior to introducing an input to transistor 50, the capacitive load coupled to output terminals 142 sees a positive and negative 150 -volts output, e.g., a 300 -volt level. That is, the laser modulator is normally on, and the driver circuit is utilized to turn the modulator off. In other applications, it may be desirable to charge a normally discharged capacitive load. Upon introducing an input pulse 148 to the base of transistor 50, the voltage on the base of transistor 20 decreases while the voltage on the base of transistor 18 increases. This causes an increase of collector current in transistor 18, and a decrease in the collector current of transistor 20. The resulting increase of current in the emitter of transistor 14 causes a decrease in the voltage on the collector thereof from the positive 150 volts to a zero value. Likewise, since the current in the emitter of transistor 28 decreases, the current in the emitter of transistor 16 increases, and the voltage on the collector of transistor 16 increases from the negative 150 volts to zero. Accordingly, the voltage across the output terminals 142, and thus the capacitive load, goes from 300 volts to zero volts, when a positive pulse 148 is applied to the base of transistor 50 (e.g., the capacitive load is discharged). If a negative pulse is applied to the base of transistor 50 (with corresponding circuit modifications) the voltage on the output terminals 142 would go from zero to 300 volts.

If the load were a resistive load rather than a capacitive load, the drive pulse for the resistive load could be taken from the junctions 112, 113 as previously noted. Since a capacitive load is being driven, current amplification is preferrable in the form of the emitter-follower transistor circuits (108,110) which generally define the load discharge stage 42.

To provide rapid recharging of the capacitive load via the output terminals 142, the load charge stage 44 is transformer coupled via transformer 86 to the transistor 18, whereby the capacitive load is charged during the fall time of the input pulse 148. Thus the combination of the stages 42, 44 provides for the discharge and charge of the capacitive load during the transient times of the input signal, to thus lower the power requirements. To this end, rather than couple the transistors 114, 108 and transistors 116, 110 together as complementary emitter-follower circuits, the invention utilizes the connection wherein the collectors of transistors 114, 116 are respectively coupled to the emitters of transistors 108, 110. Thus the transistor 108, 110 are turned on during the rise time of the input pulse 148 to discharge the capacitive load (i.e., turn off the laser modulator), and to then apply and hold the existing DC level during the "flat" period of the input pulse 148. Subsequently, during the fall time of the input pulse 148, the transistors 114, 116 are transformer coupled to the transistor 18 via a corresponding negative spike, and the capacitive load is recharged to its original 300 volts.

The transistors 14 and 16 have antisaturation diodes 76, 90, 80, 97 to improve the response of the transistors during the fall time of the input pulse 148.

The inductor coils 82, 94 are series peaking inductors for improving the rise time of the driving pulse to the output terminals 142. That is, the inductors 82, 94 look as a high impedance load during the transient period of the driving pulse. Additional diodes 124 and 140 connected to the load charge stage 42, serve to precharge the stray capacitors at the respective coil terminals.

Resistors 120 and 128 provide short circuit protection between the respective transistors, while the various capacitors, resistors, etc., coupled to the various transistors provide the usual coupling, biasing, etc., functions.

Regarding the dummy transistor stage 26, the transistor 28 thereof does not saturate during operation of the circuit, since the collector voltage of the transistor 28 is held at the same voltage as the emitter of transistor 16. This voltage is always higher than the base of transistor 28, since the emitter of transistors 16 and collector of transistor 28 are coupled to the constant current source of positive 20 volts, and since the diode 76 is connected to the base of transistor 16 to maintain the base voltage of transistor 28 higher than the collector voltage thereof.

Although the circuit of FIG. 2 is driven in single-ended manner via the input pulse 148 to transistor 50 while the base of transistor 48 is grounded, the circuit may also be driven by input pulses to either of the bases of transistors 48, 50.

I claim:

1. A high-speed pulse driver circuit for providing a balanced current drive of selected voltage to a predetermined load in response to a given input signal, comprising the combination of;
   - amplifier means including a first pair of complementary transistors operatively coupled to the given input signal to provide a pair of complementary driving currents of equal values;
   - current-reversing means selectively coupled to one of the first pair of complementary transistors to reverse the direction of the respective driving current such that one is sinking and the other sourcing, to define truly complementary mirror image driving currents, and
   - complementary push-pull output means selectively coupled to the other of said first pair of complementary transistors and to said current-reversing means for selectively introducing the sinking and sourcing complementary driving currents to said load as the balanced current drive.

2. The driver circuit of claim 1 wherein said current-reversing means includes a transistor operatively coupled between said push-pull output means and one of the complementary pair of transistors of the amplifier means.

3. The driver circuit of claim 2 wherein the push-pull output means includes;
   - a second pair of complementary transistors whose outputs are respectively coupled to the load, and which are operatively coupled to respective complementary transistors of the amplifier means to provide a pair of branches for carrying said complementary driving currents;
   - wherein the current-reversing transistor is operatively coupled within one branch extending between associated transistors of said first and second pairs of complementary transistors to provide said reversed current direction in the branch; and
   - constant current source means coupled to the junction between the current-reversing transistor and the associated transistor of the push-pull output means.

4. The driver circuit of claim 1 further comprising;
   - a preamplifier stage coupled to the amplifier means input and having at least one input thereto to receive the given input signal;
   - load charge means coupled to the load and adapted to deliver the complementary driving currents thereto in response to the transient periods of the given input signal; and
   - load discharge means coupled to the load to rapidly discharge same during a selected time period of the given input signal.

* * * * *